United States Patent [19]

Klothe

[11] 4,007,835
[45] Feb. 15, 1977

[54] FUSE AND FOLD FABRIC

[75] Inventor: William M. Klothe, Rye, N.Y.

[73] Assignee: Pellon Corporation, New York, N.Y.

[22] Filed: Aug. 26, 1975

[21] Appl. No.: 607,985

Related U.S. Application Data

[62] Division of Ser. No. 553,940, Feb. 28, 1975.

[52] U.S. Cl. ............................ 206/411; 2/274;
112/418; 206/417; 206/813; 229/DIG. 4
[51] Int. Cl.² ............... A41D 27/02; B65D 85/67
[58] Field of Search ............ 2/274; 112/418, 423;
206/389, 410–411, 417, 460, 527, 813;
229/DIG. 4; 270/86, 93

[56] References Cited

UNITED STATES PATENTS

| | | | |
|---|---|---|---|
| 1,837,775 | 12/1931 | Howard | 2/274 X |
| 2,077,403 | 4/1937 | Eiseman | 270/86 X |
| 2,346,219 | 4/1944 | Johnson | 206/411 X |
| 3,015,597 | 1/1962 | Lambert | 206/411 X |
| 3,059,354 | 10/1962 | Marchand | 112/423 |
| 3,899,123 | 8/1975 | Stullberg et al. | 229/DIG. 4 X |

*Primary Examiner*—Steven E. Lipman
*Attorney, Agent, or Firm*—Burgess, Dinklage & Sprung

[57] ABSTRACT

A roll of a continuous strip of a non-woven fabric having on only one side thereof a heat actuatable adhesive, said fabric having at least one longitudinally running perforated line running parallel with a side edge of said fabric, said fabric being free of any surface interruptions other than perforated lines running parallel with a side edge and its use in garment manufacture.

11 Claims, 13 Drawing Figures

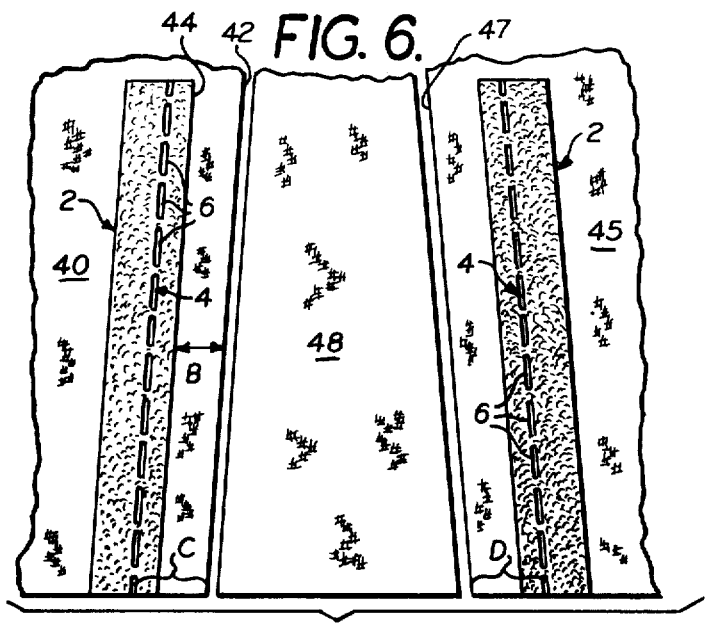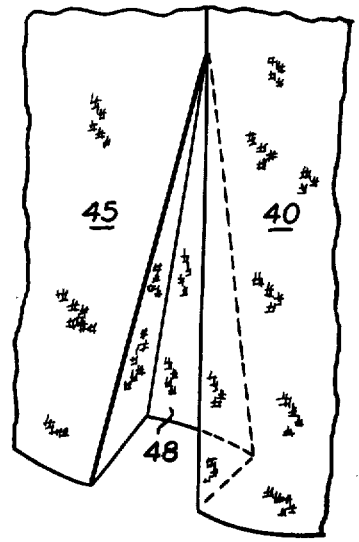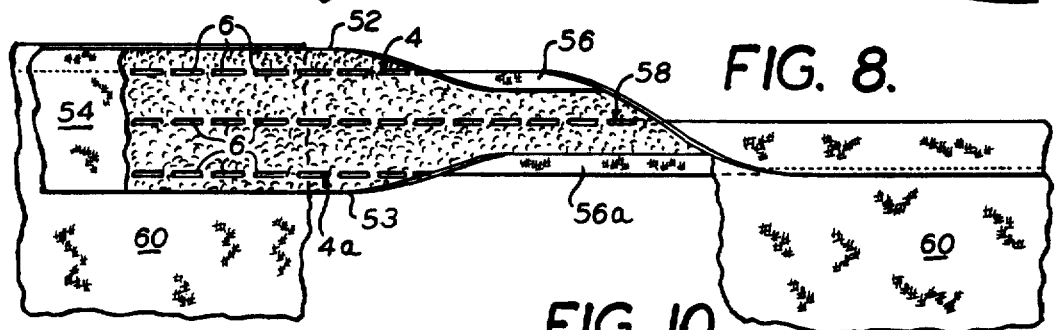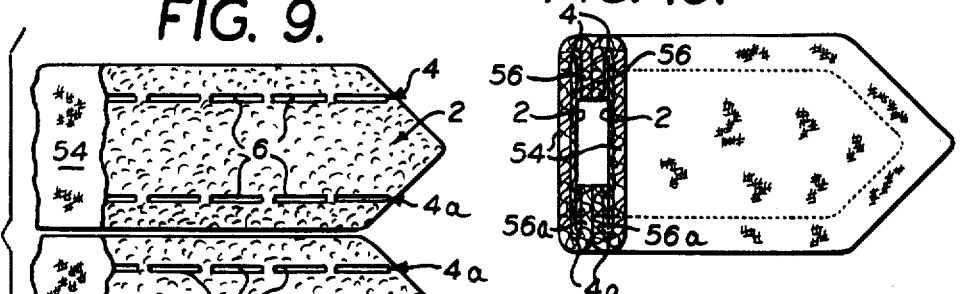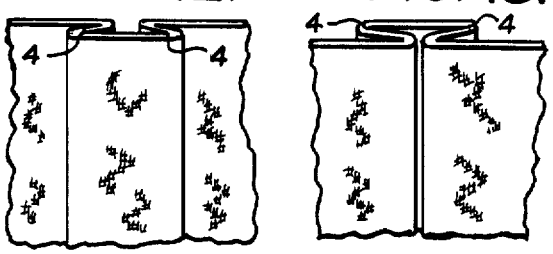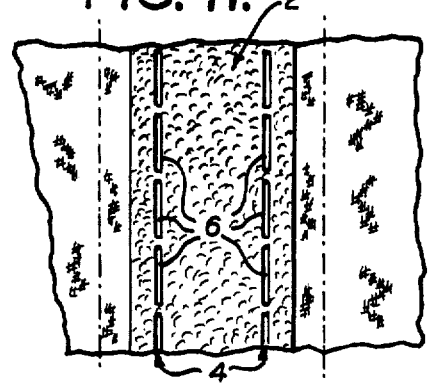

FUSE AND FOLD FABRIC

This is a division, of application Ser. No. 553,940, filed Feb. 28, 1975.

BACKGROUND OF THE INVENTION

1. Field of the Invention

This invention relates to a non-woven fabric employed as an aid in folding fabrics over a fold line and joining the so folded fabrics. This invention is directed to a continuous roll of fabric having certain specific perforated lines and the use of the same in garment manufacture, especially in belt construction, waistband construction, skirt and pocket pleats, cuffs, plackets, hems, and the like.

2. Discussion of the Prior Art

In the manufacture of garments it is quite common to fold a first piece of fabric about a straight line and to sew the so-folded fabric to an abutting fabric wherein the abutting fabric is inserted within the folds created by the folding of the first fabric. Oftentimes the material is basted initially to align the fabric in a certain manner and to hold the fabric in the so aligned position while the operator performs an additional task with the second fabric. These operations require a certain skill — the type of skill rarely found — or skill which must be painfully taught over a long period of time.

For instance in the manufacture of ladies slacks or skirts having a waistband into which is inserted a panel of fabric, the waistband is folded at one edge when attached to waistline, e.g., ⅜ inch wide to form a folded or rounded edge. The other side of the fabric is also folded in the same way and the respective hems are placed in facing engagement with one another. A panel is inserted between these folded pieces and fabric is sewn whereby the garment has a finished appearance with a flat and even waistband. Obviously to insure that the fold lines are in alignment with each so as to provide a neat garment substantial care must be taken during the folding operation. Since the folding operation is quite tedious, the operator cannot feed the assembly through the sewing machine at the normally high rate. This markedly decreases productivity and increases production costs.

Of course, production can still be high if highly skilled workers are available. But much of fabric handling is an art and few people possess the ability to properly handle the fabric so that it stays folded about a line, or a pair of lines, while being passed rapidly through a sewing machine. The garment workers of today are largely unskilled or semiskilled workers who lack these arts.

The problem of fabric handling occurs in various areas other than the exemplified assembly of a waistband and panel. In the manufacture of pleats mechanical means have been provided whereby the fabric is folded about folding dies and immediately pressed beneath a presser to set the pleat. Such an apparatus is shown in U.S. Pat. No. 3,511,424. However, oftentimes it is desired to avoid the use of a press and to pass the fabric in folded and pleated condition through a sewing machine. Again laborious techniques must be employed to maintain the fabric folded or pleated about a straight line.

Still another example of the criticality of folding a fabric about a straight line lies in the turning of sleeve hems. A sleeve hem is made from a fabric by folding the fabric over a fold line at one end thereof. The fabric which passes over the main portion of the fabric becomes the hem material which can be used in alterations. The sides of the fabric on either side of the fold line are also folded and joined together to form the sleeve. Obviously, the folding to define the end of the sleeve hem is critical since any deviation will be immediately visible and severely detracted from the appearance of the fabric thereby impairing its saleability.

The use of fabrics, especially non-woven fabrics, as support material in the assembly of garments is broadly known. For instance, garment interfacing material has been used in the assembly of men's jackets such as in the breast section to provide support. Non-woven fabric has been used as aids in the waistband of a woman's skirt and in other areas where fabric support is desired. To this end there are sold numerous different non-woven fabrics which are in the form of a continuous unperforated (although perhaps needled) mats. They are continuous and unperforated in the sense that there are no open or free zones aside from the normal pores through the fabric itself. In fact short individual pieces of discontinuous non-woven fabrics having multi-directional perforations have been proposed in the special situation of pocket manufacture for men's jackets where the fabric reinforces the pocket welt as described in U.S. Pat. No. 3,451,065.

It has become desirable, therefore, to provide a means for folding fabrics about a straight line which insures that the fabric will be kept in the folded condition when passed rapidly through a sewing machine, e.g., at a rate of 30 feet per minute or more.

It has also become desirable to provide a fabric supporting material which guides a fabric about a straight fold line whereby the resultant fabric will hold its folded position without use of a heated press and during passage of the same through a sewing machine.

It is yet another object of the invention to provide a roll of a continuous fabric supporting material which can be employed in a variety of lengths simply by cutting desired lengths from the continuous roll.

SUMMARY OF THE INVENTION

In accordance with the invention there is provided a roll of a continuous strip of a non-woven fabric said non-woven fabric having at least one perforated line running parallel with the side thereof, said non-woven fabric having a heat actuated resin on the surface of only one side thereof.

In a particularly useful embodiment of the invention a continuous strip of non-woven fabric containing heat actuatable resin on only one side thereof is provided having at least two perforated lines running parallel with respect to one another and parallel to the sides of the strip. Generally, such a strip will have such perforated lines spaced the same distances from a side edge thereof. For example, a non-woven sheet can have a width of, say, 2¾ inches, a first perforated line disposed ⅜ inch from one side and a second perforated line disposed ⅜ inch from the other side, i.e., 2⅜ inch from the first side and 2 inches from the first perforated line.

The perforated line of the non-woven fabric has a particular configuration of important dimensions and relationships. Since the perforated line is used as a fold line, (as more fully described below) fabric can gather in the area of the fold unless the width of the perforation has a certain minimum. The width of the perforations should be at least 1 mm. and up to 3 mm, preferably between 1.5 and 2.5 mm. Such dimensions permit the fabric to be folded evenly without any internal gathering of fabric to provide an attractive fold line supported on either side by the non-woven fabric.

The perforated line also must be perforated to such an extent that the regions on either side thereof are regions of greater support than the linear zone of the perforated line. For this reason, when utilizing a fabric having perforations of a width of between 1.5 and 2.5 mm, the length of each perforation should be between 1.75 and 3.25 cm., preferably between 2 and 3 mm. from one another and preferably bridged by non-woven fabric. Generally, the ratio of the length of a perforation to its width is between 20 and 10 :1. Use of perforations in the form of a line parallel to the side of the non-woven strip material of the given dimensions and ratios not only provides a material which can be used as a fold alignment device but provides a material of the desired physical properties and tensile strength so that it can be formed into continuous lengths of great length between 300 and 450 feet. When the fabric is removed from the roll the tension on the fabric at the end thereof does not cause the fabric to break off at the zones of the perforation. Hence, long continuous lengths thereof can be used. Rolls can be disposed in work centers for use by unskilled workers who do not have to use extra care in the removal of desired length from a roll.

The fibers of a non-woven fabric generally are stable fibers of fiber length between 1½ and 3 inches although continuous fibers can be employed. Generally, the fibers are natural fibers, e.g., cotton, rayon, hemp, wool, silk, cellulose or synthetic fibers, especially synthetic thermoplastic fibers, e.g., polyethylene and polyethylene and polyethylene copolymers, as well as other poly-alpha-olefin fibers, including fibers of butadiene and its copolymers, fibers of polyvinyl chloride, bromide or fluoride and their copolymers, polyvinyl alcohol containing polymers, polyamide fibers especially nylon 6 and nylon 6/6, polyester fibers especially those derived from a phthalyl containing moiety and a polyhydric alcohol, e.g., ethylene glycol and 1,4-butanediol.

BRIEF DESCRIPTION OF DRAWINGS

Referring to the drawings herein;

FIG. 6 shows the use of the non-woven strip of FIG. 1 in the making of a fabric pleat as in women's skirts.

FIG. 7 shows the resultant pleat from the operation shown in FIG. 6.

FIG. 8 shows the formation of a waistband where both sides of the fabric are folded and within the fold there is inserted a panel of fabric.

FIG. 9 shows the use of the use of a special embodiment of the invention in the manufacture of belts.

FIG. 10 is a plan view partially in section showing the disposition of the non-woven strip in a belt.

FIG. 11 shows the use of the same type of special embodiment in the formation of a pleat.

FIG. 12 shows a resultant box pleat; and

FIG. 13 shows an inverted pleat.

DESCRIPTION OF SPECIFIC EMBODIMENTS

Figure 1:
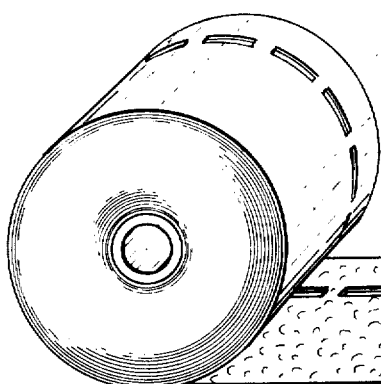
FIG. 1 is a perspective view of a roll of non-woven fabric of the invention having a perforate line.
Figure 2:
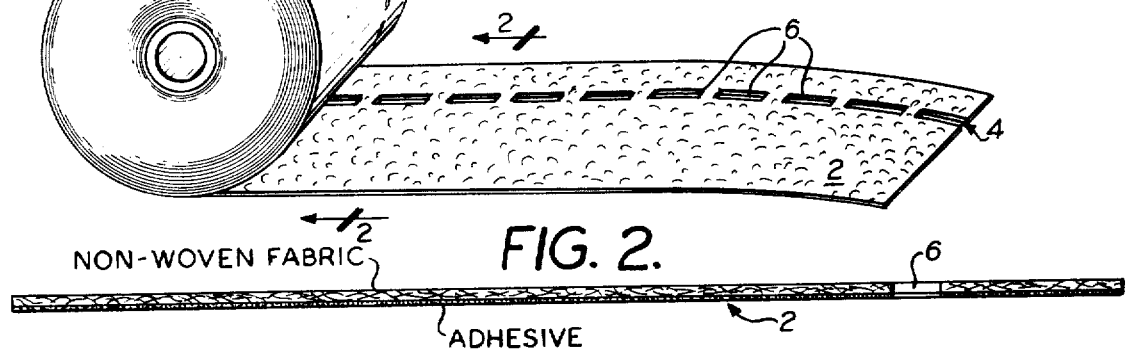
FIG. 2 is a sectional view taken along line 2—2 of FIG. 1.

Referring to the drawings herein, there is shown in FIG. 1 a continuous roll having a length of at least 5 feet, especially a length of between 300 and 450 feet of a non-woven fabric having a thickness of between 0.0010 and 0.0013. Running parallel to one side of the fabric 2 is a line 4 of perforations 6 in the general form of a rectangle. The perforations form a fold line whereby when the non-woven fabric is disposed against a garment fabric, the garment can be folded about the fold line 4 and yet supported on either side of the fold. The non-woven fabric 2 has on one side thereof a thermally activatable coating such as in the form of a resinous substance.

Figure 3:
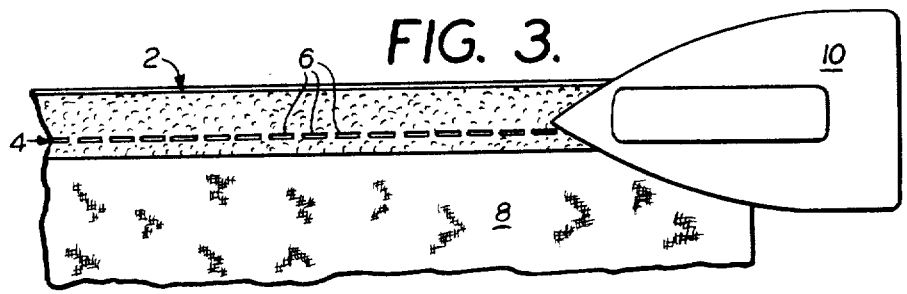
FIG. 3 is a view showing the application of the non-woven fabric to a fabric.

In FIG. 3 there is shown the manner by which the nonwoven fabric 2 is applied to a garment fabric 8. The operation is simple. The non-woven fabric 2 is disposed over the fabric 8 with the side having the adhesive facing the fabric 8. Since the fabric is of the iron-on type passage of an iron over the same will secure the non-woven fabric 2 to fabric 8. The fabric 2 is secured to fabric 8, however, preferably by applying only vertical movements of the iron 10 with respect to the fabric 2 and 8. In other words, the iron 10 is applied downwardly on to fabric 2 and a pressure is applied to fabric 2 whereby the heat from iron 10 when combined with the hand pressure will cause the adhesive on the bottom face of fabric 2 to melt into the fibers of fabric 8 thereby securing fabric 2 to fabric 8. The iron 10 is moved along a series of points to insure maximum bonding of the non-woven fabric 2 to the garment fabric 8. Of course, the non-woven fabric can be fused on a pressing machine or fuse press. The formation of a fold and the sewing of the fold is diagramatically illustrated in FIG. 4. The fabric can be simply folded manually where the fold line 4 presents a line of weakness allowing the fabric 8 to readily be folded. Moreover, by using a non-woven fusible and fold fabric of the type described herein any memory in fabric 8 whereby the fabric tends to return to its original shape is lost owing to the fact that the portions 12 and 14 on either side of fold line 4 on non-woven fabric 2 resist the tendency of the fabric 8 to restore its original position. Hence, not only does the folding operation take place quite readily, but the fabric remains folded as it passes through the sewing machine, the foot for which is shown at reference numeral 16 and the needle at reference numeral 18.

It is important to understand exactly what occurs. When the fabric is folded it substantially retains a folded condition and no special skill is required in the passage of the so-folded fabric through the sewing machine. Previously, the garment worker was required to slowly inch the folded fabric through the sewing machine owing to the great tendency of the fabric to restore to its original position. The fabric can be run through in the sewing machine in the folded condition at races of 30 feet per second and greater.

Figure 4:
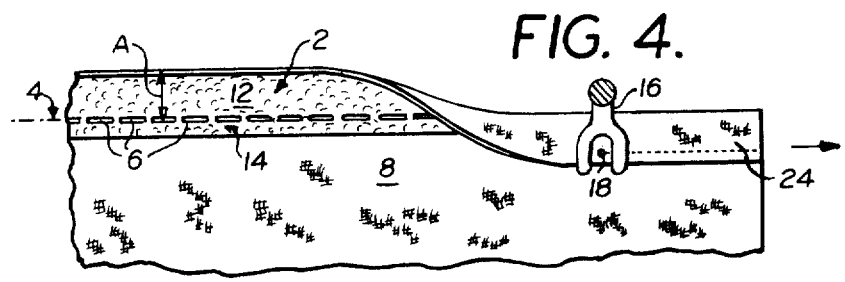
FIG. 4 shows a folding and sewing operation wherein it is seen that the fabric readily folds about the fold line and can be sewn without extensive handling of the fabric or use of skill.

Owing to the fact that the perforations 6 of the non-woven fabric 2 have a minimum width of at least 2 mm. the fabric 8 is suitably accommodated in this region in folded form whereby no extra accumulation of fabric occurs at the fold. The result is that the so-folded garment presents a neat and even appearance. It will be also apparent that since the fabric 2 has a constant width and since the fold line 4 runs parallel with the side that there is a constant dimension between the fold line 4 and the side of the fabric 2 more remote therefrom. This means that in the formation of hems and the like, the distance A shown in FIG. 4 is constant and thus the hem 24 is of constant dimension. This permits easy alterations should such alterations be required.

Figure 5:
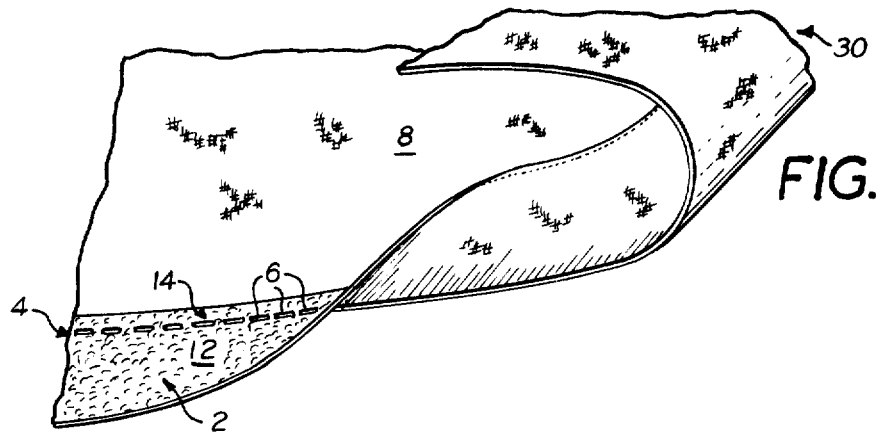
FIG. 5 shows the folding of a fabric containing a non-woven strip about the fold line.

FIG. 5 illustrates the strong tendency of a fabric to remain in folded condition even when the folded portion has not been secured to the main portion by a sewing operation. Not only can the portion 12 be folded over the fabric 8 about fold line 4, but the fold itself can be folded to return over upon itself as shown at 30 without removing the folded over portion 12 from juxtaposition against fabric 8.

The above illustrates the manner by which the continuous non-woven fabric is applied to a garment fabric and the manner wherein the folded over portion has a constant width over the entire length of the fold. The use of this principle in garment manufacture is the subject of FIGS. 6–11. In the manufacture of women's skirts, for example, it is known to provide a pleat therein. This requires that the fabric be folded on a diagonal. Since this is a focal point of the skirt it is essential that the facing folds to define the pleat be made in a neat and an attractive manner. It requires that the fabric which is folded to form the fold line be folded a constant amount whereby to provide the desired angle with which the fold meets a seam of the skirt. In FIG. 6 it is seen how this is accomplished. To a garment half 40 is applied on an angle the non-woven fabric 2 which is secured thereto by the use of a heated surface, e.g., an iron. Since the fabric has already been cut on an angle it is a simple matter to secure the fabric 2 to the garment fabric 40. The fabric 40 has been cut to form the diagonally running line 42. Non-woven fabric 2 is applied to this fabric half 40 at a constant dimension, i.e., so that the edge 44 is always the same distance B from the edge 42 of the fabric. The same arrangement occurs in respect of garment half 45 where another piece of facing non-woven fabric 2 is adhesively secured thereto insuring that the distance be between the edge of non-woven fabric 2 and the cut side 47 of the fabric 45 is constant. The next operation is to fold sections C and D about the respective fold lines 4 and to secure the so-folded material to a center portion 48. It will be realized that in FIG. 6 the garment is shown from the working side, i.e., from the side where the non-woven fabric is supplied and such side does not represent the face side of the finished garment, that being shown in FIG. 7.

Another use of the non-woven fabric 2 in garment assembly is shown in FIG. 8. As described above, the assembly of a waistband to a fabric garment, say, in a lady's skirt, presents a considerable problem, particularly if nicely folded straight edges of the waistband are desired. Generally speaking, a fabric is folded at two sides thereof and folded about a center line so that the original fold lines are in the same vertical plane. There is a waistband stitched through one perforated line to the under side of the garment fabric and folded along fold line; folded at center fold line, and third fold line and finished by a single top stitch which pierces the exterior fabric. This operation can be more readily understood when viewed in the context of the use of the non-woven fabric of the invention. There is applied to a waistband type fabric a pair of strips 2 of the invention aligned so that the fold lines 4 are disposed about ⅜ inch from the edges 52 and 53 respectively of the fabric and in the center of the strip. The non-woven strip is then ironed on to the waistband material 54 as described and then is folded about fold lines 4 and 4a to form folds 56 and 56a. The waistband is then folded about a center fold 46 or zone 58 lying in the center of the strip of non-woven fabric. This forms the material into a waistband or belt. When employed as a waistband there is inserted a garment fabric panel 60 between the facing folds 56 and 58 as shown in the right portion of the garment in FIG. 8. The entire assembly is then top stitched with a single stitch whereby to join a garment waistband to the fabric therebeneath. This operation demonstrates the use of the non-woven fabric in the rapid assembly of a waistband and joining of the fabric panel 60 therewithin. Normally, this operation would take a considerable period of time owing to the tendency of the fabric 54 to return to an unfolded position. Skilled operators have been required for this operation owing to the fact that three folding operations are required, two to form the folded sections 56 and 56a and one to fold the fabric 54's halves about fold line 58. To do this, and to insert the fabric panel 60 within the folds and to sew the same, has required a considerable amount of care if the resultant product is to have a neat appearance.

FIGS. 9 and 10 show the use of an embodiment of the fabric in the formation of a belt formed from two separate pieces of material. In FIG. 9 there is shown the use of a non-woven fabric of the invention having a plurality of perforate lines 4 running parallel with one another. Such a fabric is used in belt assembly where the fabrics are folded over the fold lines 4 and 4a and are brought into facing relationship with one another and secured in the zone of folding as shown in FIG. 10. Such a belt has an attractive appearance and is in many instances preferable to a belt formed by a single piece of fabric. Of course, the non-woven fabric can be utilized to form a belt in the manner of FIG. 8 wherein no garment fabric panel 60 is inserted between folds 56 and 56a. It will also be noted that instead of employing two separate strips of nonwoven fabric 2 there can be employed a single non-woven fabric having three parallel running perforate lines wherein the outer two perforate lines are used to form the folds 56 and 56a and the inner perforate line is used as a line of weakness to facilitate formation of the fold about fold line 58. In such an instance the third perforate line is disposed generally centrally of the non-woven fabric and runs parallel to the other fold lines 4 and 4a along the center of the non-woven fabric.

FIG. 11 illustrates the manner by which inverted or boxed pleats are formed. Obviously, a boxed pleat is formed in FIG. 12 by disposing the non-woven fabric illustrated in FIG. 11 on the unfinished side of the garment fabric. If it were to be disposed upon the finished side there would result the inverted pleat assembly shown in FIG. 13.

The manufacture of the non-woven fabric of the invention is a relatively simple matter. Initially, there is first obtained a non-woven fabric having a thickness between 0.001 and 0.0013 inch. The fabric is thereafter treated on one side to dispose on the surface a heat actuatable adhesive. Manufacture of such non-woven fabrics are known in the art. The fabric can initially be cut into widths of say 1 to 7 inches. The product is then passed through a stamping or diecutting machine whereby the perforations 6 are cut out of the fabric. In operation of series of separate rolls can be made from a large roll of non-woven fabric having a width of, say, 45 inches whereby the perforations 6 are formed in the non-woven fabric and the same is cut into several distinct rolls of widths the sum of which equal 45 inches.

What is claimed is:

1. A roll for facilitating the folding over of an edge of a continuous width of textile fabric to which the material of the roll is adhesively secured to define a rounded straight line fold characterized by outer layers of juxtaposed textile fabric and a pair of inner layers of roll fabric consisting essentially of a heat sensitive strip of a monolayer of a non-woven synthetic textile fabric of short staple fibers which fabric has on only one side thereof a heat actuatable adhesive, said fabric having a constant width and at least one longitudinally running perforated line of perforations each of which has a longer longitudinal dimension than a transverse direction, which perforated lines runs parallel with a side edge of said fabric, said fabric being free of any surface interruptions other than perforated lines running parallel with a side edge, whereby when said strip of non-woven textile fibers is unwound from said roll, disposed over said textile fabric and thermally adhesively secured thereto there is provided a linear zone non-supported by said strip and a zone on each side of said perforated line supported by said strip whereby said textile fabric can be accurately and rapidly folded over at said linear zone of non-support to form a folded article having a reduced tendency to return to its original shape and having an upper and lower layer of textile fabric and a pair of juxtaposed non-woven strips therebetween secured to the resultant facing sides of the upper and lower layers of said textile fabric.

2. A roll according to claim 1 having a length between 350 and 450 feet.

3. A roll according to claim 1 wherein the roll has a length of at least 5 feet, the perforations are in the form of a rectangles, each perforation has a width between 1.5 and 2.5 mm., a length between 2 cm., and 3 cm. and a length/width ratio of between 20:1 and 10.1.

4. A roll according to claim 2 wherein said non-woven fabric has a thickness between 0.001 inch and 0.0013 inch.

5. A roll according to claim 3 wherein said roll is made of thermoplastic fibers.

6. A roll according to claim 4 wherein said thermoplastic fibers are staple fibers of length between 1½ and 3 inches.

7. A roll according to claim 2 wherein said nonwoven strip has a plurality of perforate lines running lengthwise parallel to one another.

8. A roll according to claim 6 wherein said non-woven strip has three perforate lengthwise running lines, one of which is disposed centrally within said strip.

9. A roll according to claim 1 wherein the fibers of said non-woven synthetic textile fabric are selected from the group consisting of cotton, rayon, hemp, wool, silk, cellulose and synthetic fibers.

10. A roll according to claim 9 wherein the fibers of said non-woven synthetic textile fabric are synthetic thermoplastic fibers.

11. A roll according to claim 10 wherein said synthetic thermoplastic fibers are selected from the group consisting of poly-alpha-olefin fibers, fibers of polyvinyl chloride, fibers of polyvinyl bromide, fibers of polyvinyl fluoride, polymers of polyvinyl alcohol, polyamide fibers and polyester fibers.

* * * * *